United States Patent [19]

Delacour

[11] Patent Number: 5,778,801
[45] Date of Patent: Jul. 14, 1998

[54] FORKLIFT PALLET MADE OF PLASTICS MATERIAL, AND METHOD OF MANUFACTURE

[76] Inventor: Frederic Delacour, 25, Rue Etienne-Marcel, 37000 Tours, France

[21] Appl. No.: 557,161

[22] PCT Filed: May 10, 1994

[86] PCT No.: PCT/FR94/00555

§ 371 Date: May 21, 1996

§ 102(e) Date: May 21, 1996

[87] PCT Pub. No.: WO94/26600

PCT Pub. Date: Nov. 24, 1994

[30] Foreign Application Priority Data

May 10, 1993 [FR] France ................................ 93 05564

[51] Int. Cl.⁶ .............................................. B65D 19/00
[52] U.S. Cl. .................................. 108/57.25; 108/901
[58] Field of Search .................................. 108/901, 902, 108/51.1, 53.1, 53.3, 51.11, 57.25, 57.27, 57.28

[56] References Cited

U.S. PATENT DOCUMENTS

| | | |
|---|---|---|
| 2,371,106 | 3/1945 | Lewis et al. . |
| 3,269,336 | 8/1966 | Naylor et al. ........................ 108/901 X |
| 3,604,368 | 9/1971 | Baxter .................................. 108/901 X |
| 3,636,889 | 1/1972 | Mangold ................................ 108/53.1 |
| 3,680,496 | 8/1972 | Westlake, Jr. . |
| 3,719,157 | 3/1973 | Arcocha et al. ..................... 108/901 X |
| 3,926,321 | 12/1975 | Trebilcock ......................... 108/53.1 X |
| 4,013,021 | 3/1977 | Steinlein et al. .................... 108/901 X |
| 4,606,278 | 8/1986 | Shuert ................................ 108/901 X |
| 4,960,553 | 10/1990 | DeBruibe et al. .................. 108/901 X |
| 5,186,338 | 2/1993 | Boutet ................................ 108/53.1 X |

FOREIGN PATENT DOCUMENTS

| | | | |
|---|---|---|---|
| 33241 | 8/1970 | Australia ............................ 108/901 |
| 1543637 | 10/1968 | France . | |
| 2110348 | 6/1972 | France . | |
| 2232200 | 1/1973 | Germany ............................ 108/901 |
| 2652702 | 5/1977 | Germany . | |
| 9102161 | 7/1993 | Netherlands . | |
| 1420222 | 1/1976 | United Kingdom . | |

*Primary Examiner*—Jose V. Chen
*Attorney, Agent, or Firm*—Harness, Dickey & Pierce, P.L.C.

[57] ABSTRACT

A fork pallet structure and a method of manufacturing a forklift pallet which is applicable to handling goods in industries where hygiene requirements are strict, such as food industries, the pharmaceutical and cosmetics industries, and "clean" technology industries. The pallet of the invention comprises a platform (30) and blocks (33–35) for spacing the platform from a rest surface such as the ground, both the platform and the blocks being made of solid plastics material. The blocks are optionally interconnected by a belt or by runners and are connected together by a polyfusion method that does not leave any interstices, and does not run any risk of creating crannies while the pallet is in use. The pallet is suitable for use in industries having strict hygiene requirements, such as the food industry.

12 Claims, 4 Drawing Sheets

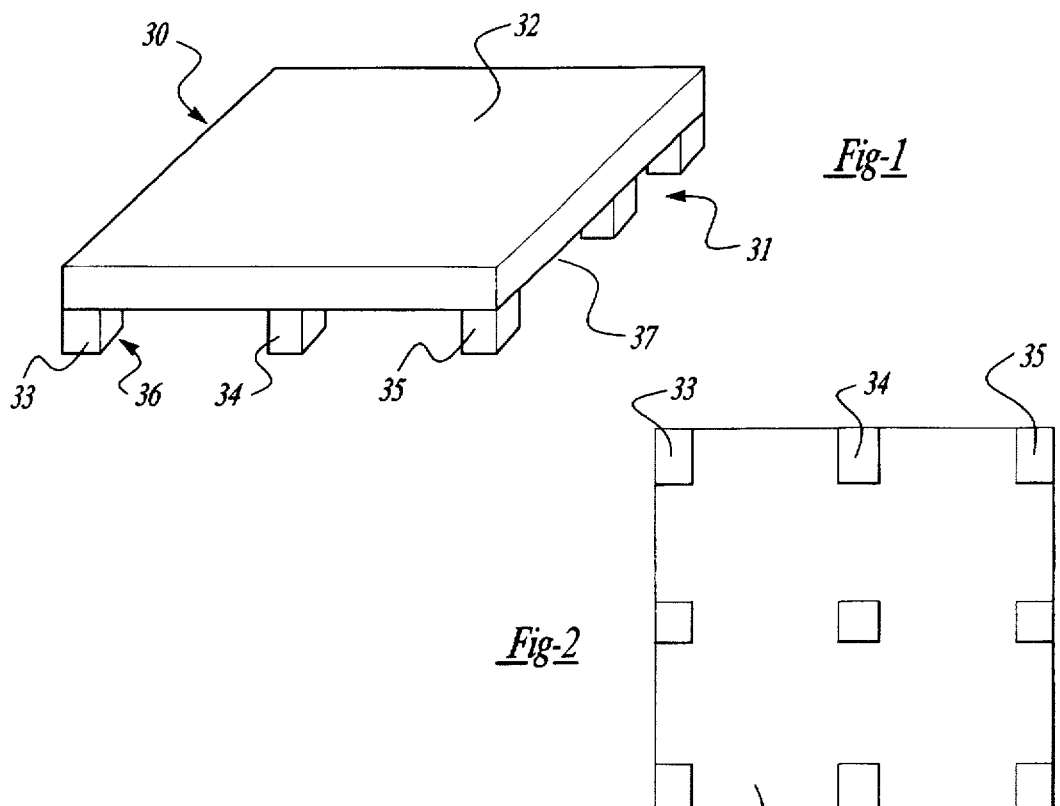
Fig-1
Fig-2
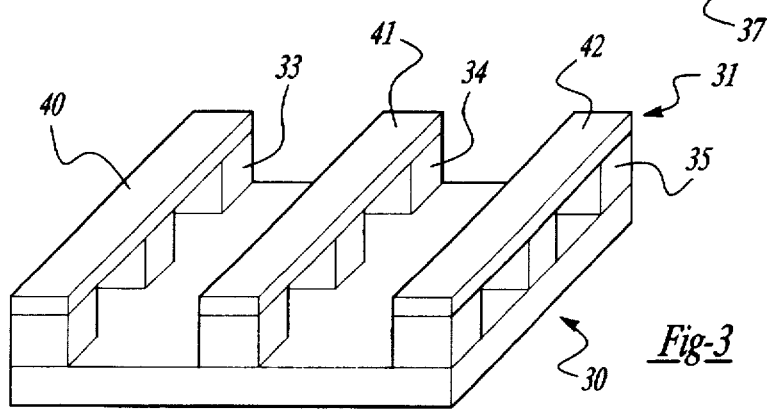
Fig-3
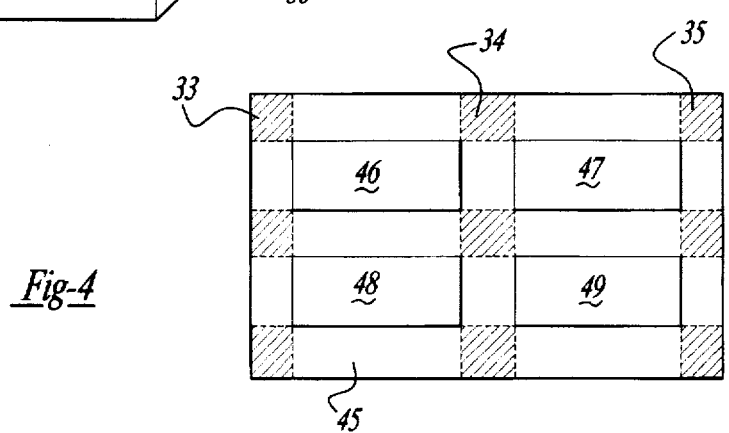
Fig-4

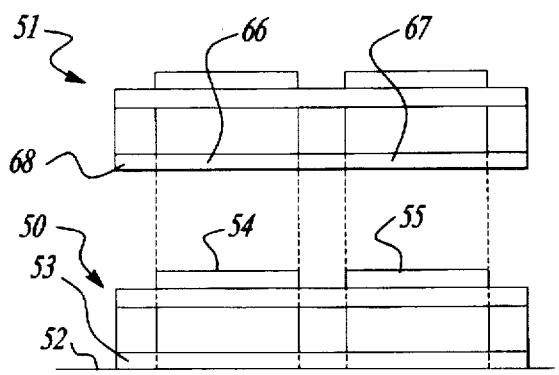
_Fig-5_
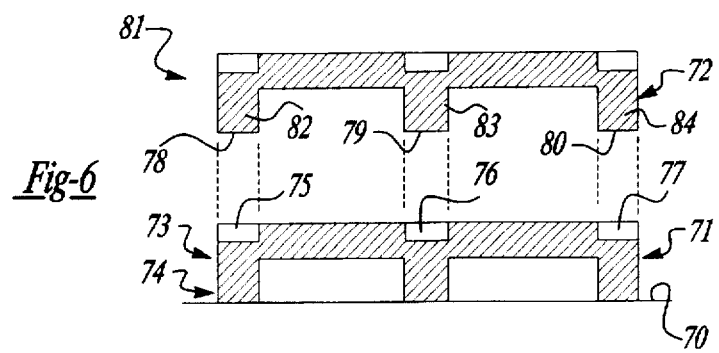
_Fig-6_
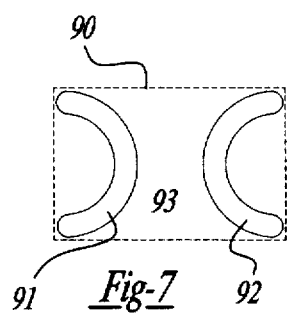
_Fig-7_
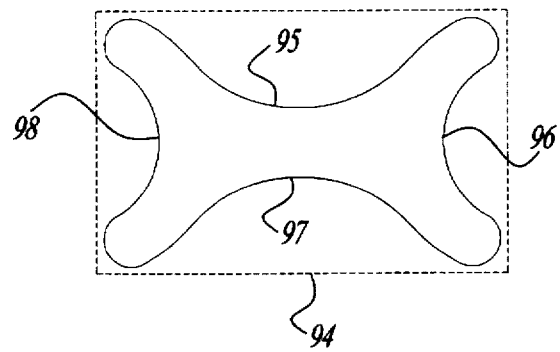
_Fig-8_
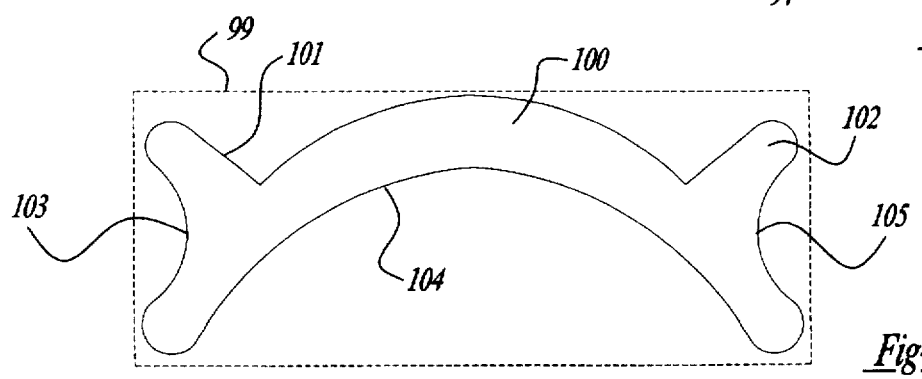
_Fig-9_

FORKLIFT PALLET MADE OF PLASTICS MATERIAL, AND METHOD OF MANUFACTURE

The present invention relates to a forklift pallet comprising a platform on the top surface of which goods can be placed for handling purposes, and itself resting above a rest surface. The invention also relates to a method of manufacturing it. The invention is applicable to handling goods in industries having high hygiene requirements, such as food industries, pharmaceutical and cosmetics industries, and "clean" technology industries.

A large number of forklift pallets are known, such as those described in approved French standard No. NF H 50-001, that comprise an upper platform resting on three runners that allow enough space between one another to enable the forks of forklift machines to be inserted between them.

Pallets of that type are commonly used for transporting and storing materials and merchandise of all kinds, and they are traditionally made of wood so as to provide a platform constituted by some number of parallel planks with or without gaps between them, which planks are generally nailed to three cross-members of essentially the same thickness as the planks of the platform, which cross-members are located at respective aligned ends of the planks and also halfway between said ends.

The runners are located beneath the cross-members and may be implemented in the form of solid beams, or in order to reduce the weight and the cost of a pallet, the runners may be implemented as a number of individual blocks for each runner.

Beneath the blocks there may be bottom planks extending parallel to the planks of the platform and interconnecting the blocks of each runner along their faces opposite from their faces connected to the cross-members.

The provision of bottom planks increases the stability of runners implemented as separate blocks.

Pallets of the above type have given entire satisfaction when it comes to transporting and storing a wide and varied range of materials and merchandise. Nevertheless, for reasons of hygiene, wood, and in particular the way in which the various planks, cross-members, and blocks are connected together, are not acceptable for handling foodstuffs that have not been packaged. The wooden surface and the interstices that necessarily exist between planks that have been nailed together prevent such pallets from being cleaned in completely hygienic manner since microbes take up residence in and proliferate in the interstices, and in the surface of the wood itself.

Proposals have been made to produce pallets of the above kind in a material other than wood and suitable for impeccable surface cleaning. Nevertheless, there remains a problem of microbes proliferating in the interstices between the planks which cannot be eliminated merely by changing the kind of material used.

To solve this remaining problem, proposals have been made to manufacture forklift pallets for use with foodstuffs in a shape that is geometrically identical to that described above, with the exception that the platform does not comprise a plurality of parallel planks but comprises a single sheet, the pallet being manufactured by molding polyethylene around reinforcement made of metal or of wood that is fully embedded within the polyethylene.

When pallets of that type are used during repeated cycles of use separated by cycles of cleaning, it has been found that incompatibility between physical properties such as thermal expansion or stiffness of the materials constituting the reinforcement and the molded plastic is such that after a certain number of cycles of use, cracks form at certain strategic locations in the pallet, which cracks again produce locations that are favorable to the proliferation of microbes while preventing cleaning since the cracks are too fine to enable effective cleaning to be performed.

An object of the present invention is to mitigate the drawbacks of the prior art and to create a pallet which can be manufactured at reasonable cost, i.e. cheaper than injected pallets, and which satisfies all the hygiene requirements of the food industry.

In addition, the type of pallet that the invention seeks to provide must be produced by a method that is easily adapted to variations in dimensions so as to enable it to be adapted to changes in the requirements of users. Such adaptation is difficult to provide with injected pallets and can only be done at high cost.

According to the present invention, such a pallet comprises a platform spaced apart from a rest surface so as to pass a handling member such as a fork of a forklift truck. The invention is characterized in that, the platform is made of a solid plastics material such as polyethylene or polypropylene, and in that the platform also includes spacer means for spacing it from the rest surface, the spacer means being made of a solid plastics material such as polyethylene or polypropylene, so as to leave no crannies in the event of breakage by a blunt instrument.

According to an aspect of the invention, the spacer means is secured to the platform by a polyfusion method so that there remains no outwardly-opening interstices between the spacer means and the platform.

According to another aspect of the invention, one of the facing surfaces includes a projecting peripheral zone so as to constitute a waterproof border around the connection zone.

According to another aspect of the invention, melting is performed so as to establish continuity between the organic chains of the two surfaces assembled together.

According to another aspect of the invention, the spacer means comprise a plurality of blocks directly secured to the bottom face of the platform.

According to another aspect of the invention, the spacer means also include a plurality of runners each directly secured to a plurality of free ends of blocks.

According to another aspect of the invention, the runners are disposed so as to constitute an uninterrupted continuous belt.

According to another aspect of the invention, each of the blocks is constituted by one of the following forms, on its own or in combination:

a plane thick plate;

a solid volume such as a solid cube;

a curved plate having a single concave side;

a curved plate having ramifications.

According to another aspect of the invention, the pallet includes stacking means such as the platform including on its top face means suitable for receiving complementary means disposed on the bottom face at the bottom of the spacer means of a pallet that is to be stacked on the pallet.

According to another aspect of the invention, the stacking means disposed on the top surface of the platform is constituted by a plurality of projecting plates with gaps between them suitable for being received in a corresponding portion of the stacking means or the bottom of the next spacer means.

According to other means of the invention, the stacking means disposed on the top surface of the platform is constituted by a plurality of depressions within which portions of the corresponding ends of the stacking means on the bottom of the next spacer means are received.

According to other means of the invention, the top surface of the platform include embossing formed by a hot press process and/or includes microperforation.

According to another aspect of the invention, the stacking means include embossing formed in the bottom surface of the bottom of the spacer means, which bottom embossing is adapted to retain the following pallet by embossing on the top surface of is platform, and is adapted to retain and prevent horizontal movements along both axes of the next pallet by means of the embossing.

The platform and the runners are assembled together by a method comprising a step of melting the material where portions of the components of the pallet are likely to be placed one against another, which melting is obtained by a heating technique using a heating mirror or by welding by linear vibration, or by welding using microwaves or ultrasound.

Advantageously, the pallets of the invention may be treated after polyfusion of the platform and of the spacer means for spacing it apart from the rest surface by an additional treatment step which removes the flash of the polyfusion.

The present invention also relates to a method of manufacturing a pallet as described above, which method comprises the following steps:

preparing individual components of a pallet from plates and/or bars of plastics material by cutting, or by molding;

heating surface portions of said components until they melt, which portions are intended to be connected to similarly heated portions of the other components;

causing at least one first heated portion to face at least one second heated portion;

applying predetermined pressure between the two components whose two respective heated portions have been caused to face each other; and cooling the heated portions while maintaining said pressure.

Advantageously, the method of the invention may also comprise a step of removing the flash that is formed by applying pressure against the heated portions.

Typically, the temperature at which the surface portions are heated lies in the range 100° C. to 300° C.

The invention is described in greater detail below with reference to the drawings, in which:

FIG. 1 is a perspective view of a first embodiment of a pallet of the invention;

FIG. 2 is a view of the underside of the FIG. 1 pallet;

FIG. 3 is a perspective view of another embodiment of the pallet of the invention;

FIG. 4 is a view of the underside of another embodiment of a let of the invention;

FIG. 5 is a side view of another embodiment of the pallet of the invention, enabling pallets of the invention to be superposed or stacked;

FIG. 6 is a view of another embodiment of pallets designed for stacking purposes;

FIGS. 7 to 9 are detail views from beneath of pallets of the invention;

Figure 12:
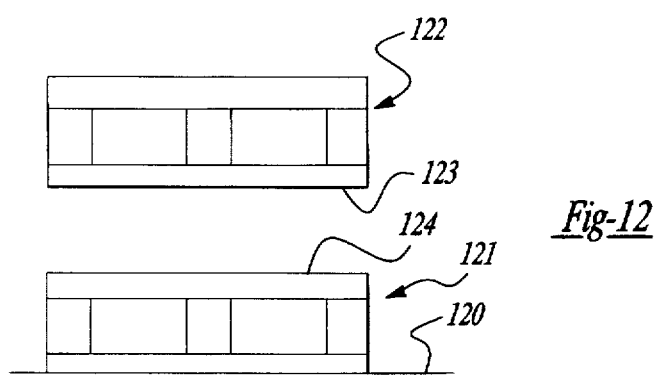
Figure 14:
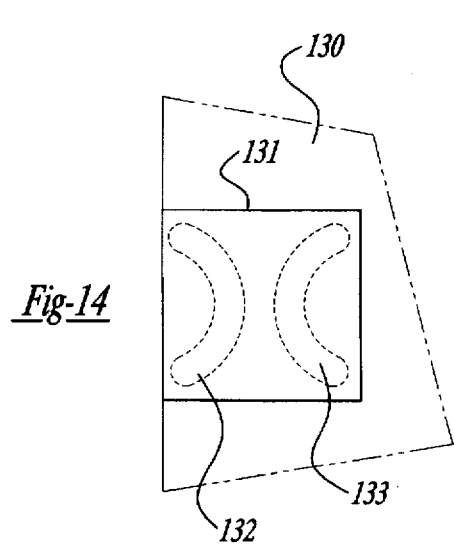
Figure 15:
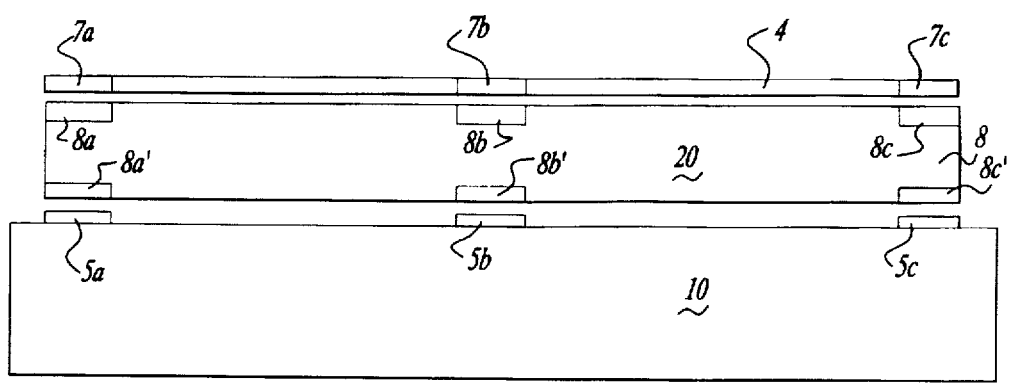

FIG. 12 view showing another embodiment of pallets suitable for stacking;

FIG. 18 View of the top surface of the platform of a pallet of the invention;

FIG. 14 is a detailed view of the top surface of a pallet of the invention that is suitable for stacking; and FIG. 15 is a diagram representative of a step in the manufacture of a pallet of the invention, which step concerns the technique of melting by means of heating mirrors.

FIG. 1 shows a first embodiment of a forklift pallet of the invention. In general, forklift pallets of the invention comprise a platform 30 which is spaced apart from the ground or any other appropriate rest surface by spacer means 31 for spacing it from the rest surface. The spacer means 31 comprise components that are spaced apart so as to leave sufficient gaps for receiving the fork of a forklift truck or of any other goods-handling machine.

One of the problems solved by the invention is the problem whereby a shock due to contact between the fork of a forklift truck running into the spacer means of a loaded pallet at full speed is such that blocks made of hollow plastics material splinter and as a result present crannies or cracks within which bacteria and microbes develop, and also hollows that are extremely difficult to clean and make hygienic without taking considerable precautions.

To this end, the invention uses a solid plastics material of such a shape that in the event of breakage there do not appear any cracks or crannies that are unacceptable from the hygiene point of view in the industries for which the pallet is intended.

In FIG. 1, the platform 30 has a top face or surface 32 on which the goods to be handled are placed. Such goods may be constituted by cheese, for example, or by quarters of meat that have not been packaged. The bottom face or surface of the platform 30 is referenced 37 in FIG. 1 and in FIG. 2, and it carries spacer means 31 constituted by a plurality of blocks 33–35 whose surfaces remote from the bottom surface of the bottom 36 are closed since the material is solid. These surfaces serve to support the pallet on a rest surface such as the ground.

FIG. 2 is a view of the underside of the FIG. 1 pallet, and it can be seen that the blocks are organized in three rectilinear rows of three blocks each.

The platform is preferably constituted by a plane plate that is rectangular in shape. Any solid plate can be used, so as to avoid it presenting any interstices or crannies that are impossible or difficult to clean.

The spacer means 31 are assembled to the facing bottom surface 37 of the platform 30 by a polyfusion method of the kind that causes the molecular chains of the two parts in contact to be reconstituted and that causes at least the peripheral zone of the interface between the two parts to be completely waterproof. As a result, there is no longer any possibility of interstices in which bacteria can grow and microbes can proliferate.

FIG. 3 is a perspective view of another embodiment of a pallet of the invention. In FIG. 3, the pallet is shown upside-down, and it has the same components as the pallet of FIGS. 1 and 2. These components are given the same reference numerals, and the blocks 33–35 are interconnected via their free end surfaces by means of respective runners or planks 40, 41, and 42 which extend parallel to a direction of the platform, such as one of its sides. The runners are constituted by plates of rectangular shape that are made of solid plastics material, and they are secured by means of a polyfusion method as described above.

FIG. 4 is a view from beneath of a third embodiment of a forklift pallet of the invention. The pallet of the FIG. 4 embodiment uses the same components as that of FIG. 1, plus a belt 45. In a preferred embodiment, the belt 45 is made in the form of a plane plate of solid plastics material which has been pierced by four square openings respectively referenced 46 to 49 so that the blocks such as 33 to 35 are connected together by the top face of the belt or plate 45 (not visible in the drawing). FIG. 4 uses dashed lines and shading to represent the zone occupied by each of the blocks stuck to the top face of the plate 45.

FIG. 4 shows the bottom face of the bottom of the spacer means for the pallet in question.

In FIG. 5, there can be seen a plurality of pallets 50 and 51 of the invention being piled or stacked together. A pallet 50, implemented as shown in FIG. 4, is placed on a rest surface 52 such as the floor of a warehouse. The pallet is shown in side view. Its platform 53 carries plates given respective references 54 and 55 which are designed to penetrate into respective openings 66 and 67 of the next pallet 51, which openings are formed through the belt 68 of said second pallet 51. The belt 68 is thus dimensioned so as to fit the plates 54 and 55 placed on the top surface 32 of the platform 30. In such an embodiment, the top surface 32 of the platform 30 of the pallet of the invention therefore includes four projecting plates of height substantially equal to the thickness of the belt of the spacer means so as to enable a plurality of pallets to be stacked so that they can be put away, stored, and transferred together as a unit in desired locations of the goods-handling warehouse.

The plates 54 and 55 may be installed by adhesive, welding, or polyfusion attaching separate plates onto the plane surface of a plane platform 30 such as that shown in FIG. 1. In another embodiment, the plates 54 are obtained by removing matter by machining the top face 32 of the platform 30 of each pallet.

FIG. 6 shows another embodiment of stacking means of the invention. In general, the stacking means of the invention comprise means disposed on the bottom face or surface of the spacer means for spacing from the rest surface of the preceding pallet. These means are shaped to fit complementary means formed on the top surface of the platform of the pallet which constitutes the rest surface in a stack.

FIG. 6 shows stacking means particularly suitable for the pallets of the FIG. 1 embodiment. A rest surface such as the floor 70 is shown together with two successive pallets 71 and 72 each constituted by a platform 73 and spacer means 75 constituted by a plurality of blocks. The top surface of the platform 73 of the pallet 71 is provided with a plurality of respective depressions 75, 76, and 77 within which end portions 78 to 80 are respectively received of the stacking means located at the bottom of the spacer means 81 of the following pallet 72. In this case, the stacking means on the bottom of the following spacer means 81 are constituted directly by the support surfaces 78 to 80 of the respective blocks 82 to 84 of the spacer means 81.

It is clear that in order to improve stacking, the depressions in the embodiment of FIG. 6 and the side surfaces at the bottoms of the spacer means may be given slopes for the purpose of mutual centering when the following pallet comes close to a supporting pallet.

The same sloping disposition may be envisaged in the stacking means shown in FIG. 5 and described above.

FIGS. 7 to 9 show three embodiments of solid blocks for constituting spacer means of the invention. In general, a block of the invention is constituted by a solid plate. The solid plate may be elongate in shape, however it may also be constituted by a solid block such as a cube or a rectangular parallelepiped. Other shapes have been studied that are particularly well adapted to the fact that the forks of goods-handling machines can constitute a danger for a pallet. To this end, the solid blocks are provided with profiles that ensure relative deflection of the movement of a fork while it is being inserted in the spacer means.

Amongst such shapes, curved shapes are shown as in FIG. 7. The block 90 shown in FIG. 7 is inscribed within a rectangular section that is shown in dashed outline. The block is constituted by two adjacent C-shaped plates 91 and 92. The gap 93 between the two shapes 91 and 92 is designed to provide the block with a plurality of points on which it can receive shocks from the fork of a goods-handling machine.

FIG. 8 shows another embodiment of a block that is inscribed within a parallelepiped 94 and that is X-shaped, being made up of four outside curves respectively 95 to 98.

FIG. 9 shows a third embodiment of a block for a goods-handling pallet of the invention.

The block 99 is likewise inscribed within a rectangular section and it is in the form of an upside-down V-shape 100 provided with two substantially perpendicular ramifications 101 and 102 so as to present three hollows respectively referenced 103, 104, and 105 which are all accessible from outside the pallet and which serve to provide a plurality of points which can receive shocks from a fork.

The shapes chosen for FIGS. 7 to 9 have been found to have the best mechanical performance, particularly when using the polyfusion method to connect them to the bottom surface of the platform or to the top surfaces of runners or a belt belonging to the spacer means of the invention.

Figure 10:
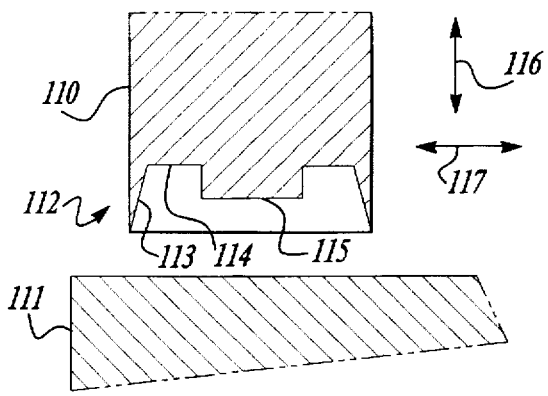
FIGS. 10 and 11 are fragmentary section views showing two steps in assembling portions in the invention.
Figure 11:
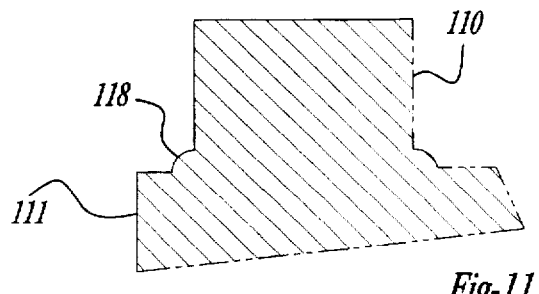

FIGS. 10 and 11 show a particular embodiment suitable for polyfusion by means of a mechanical friction method.

FIG. 10 is a section through a first part 110, e.g. a block, and a section through a second part 111 such as a platform. The end 112 of the part 110 has a lateral rim 113 designed to completely surround the connection surface between the two parts. A recess 114 is provided together with a projection 115. The two parts are moved towards each other by applying pressure in the direction 116 and they are put into place by a special machine which is not directly concerned with the invention and which is neither shown nor described, which machine causes the parts to vibrate relative to each other in directions 117. By an appropriate selection of vibration acceleration and pressure, the contacting zones of the parts 110 and 111 are caused to melt completely, as represented by the section of FIG. 12. The peripheral bead 118 is obtained by melting the lateral projection 113 of the initial part 110, and serves to ensure that the bond between the two parts is thoroughly waterproof. Another advantage of this disposition is that it makes it possible to avoid the presence of interstices resulting from the method of providing melting between the two parts.

FIG. 12 shows further stacking means of the invention. In this disposition, there can be seen a support surface such as the floor 120, and two forklift pallets respectively referenced 121 and 122 that are about to be stacked together. The pallets are constituted by pallets as shown in FIGS. 2 and 3, in particular, in which the spacer means are interconnected via their bottom faces by runners or by a belt. The top surface of each pallet platform is provided with embossing obtained by a hot press method, which is not directly concerned by the invention and which serves to increase the coefficient of friction of said surface relative to any other substance. Such a disposition is advantageous in itself, not only for stacking, but also for transporting goods which might fall onto the ground while a forklift truck is accelerating, merely under the combined effects of gravity and inertia. Embossing may advantageously also be used as stacking means. To this end, the bottom surface 123 of the following pallet 122 is also provided with embossing (not shown), which embossing is complementary and designed to match the embossing on the top face 124 of the platform of the pallet 121. By this disposition the pallets remain fixed to one another in spite of lateral accelerations, the embossing being appropriate for holding and preventing horizontal displacements along either axis between one pallet and the next.

Figure 13:
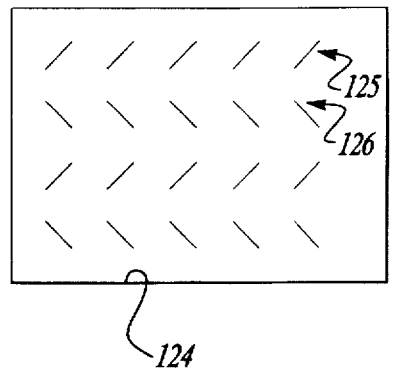

FIG. 13 shows the top surface 124 of the platform of a forklift pallet provided with embossing. In this case, the embossing is constituted by shallow perforations (to a depth of a few millimeters) taking up the form of respective chevrons 125 in a first direction and 126 in a second direction. The chevrons are aligned in directions parallel to one of the sides of the platform. The embossing is obtained by rolling over a cylinder that is fitted with studs of a shape that matches that of the chevrons 125 and 126, which cylinder is heated and caused to move with pressure and speed that are determined along the desired direction shown in FIG. 13.

In another embodiment of the invention, in order to impart good qualities to the pallet from the hygiene point of view in particular, but also from the point of view of keeping the goods aired, the platform may be provided with microperforations.

FIG. 14 shows one way of performing stacking in accordance with the invention. FIG. 14 shows the top surface 130 of the platform of a pallet of the invention, which platform is provided with a depression 131 within which the bottom or the bottom surface of fastening means are engaged, which fastening means are constituted by the legs or blocks constituting one of the embodiments of FIGS. 7 to 9. Dash lines show the contact face, e.g. of a block as shown in FIG. 7 where there can be seen the outline 132 and 133 of the block, shown in dashed lines. This achieves excellent stacking of pallets of the invention.

The platform of the pallet is fixed to its spacer means for spacing it from a rest surface by a polyfusion method which not only achieves adhesion between the platform and the spacer means, but also is effective in melting the interface between the platform and the spacer means for spacing it from the rest surface so as to eliminate in reliable and long-lasting manner any possibility of interstices being created which could encourage the proliferation of microbes.

FIG. 15 is a diagram showing how polyfusion is performed by means of a heater mirror between a platform 4 and three blocks 5a, 5b, and 5c of the spacer means for spacing the platform from the rest surface, which blocks are disposed on a working support 10.

The blocks 5a to 5c are disposed on said working support in the same orientation and spacing as corresponds to the shape of the finished pallet, and heating matrix means 8 are placed on the blocks 5a to 5c.

The heating matrix comprises a main body 20 that is thermally insulating to a greater or lesser extent. Heater elements 8a', 8b', and 8c' at the bottom surface of the main body 20 are disposed so as to correspond to the locations of the blocks 5a, 5b, and 5c. Similarly, heater elements 8a, 8b, and 8c are disposed at the top surface of the main body 20 of the heater means 8 at locations likewise corresponding to the positions of the blocks 5a, 5b, and 5c. The power supply circuit and the nature of the heating elements do not form part of the present invention and are therefore not shown in detail.

By way of example, the components 5a to 5c, etc., are made of polypropylene, and the portions thereof that are melted are raised to a temperature lying in the range 215° C to 235° C.

The size of these heater elements 8a to 8c' extending in a direction perpendicular to the plane of the drawings corresponds to the thickness of the platform 4 so as to enable geometrically corresponding portions to be heated where the bottom surface of the platform 4 overlies the blocks 5a to 5c, until said surfaces melt, after which the heating matrix 8 is withdrawn and the platform 4 is lowered so as to put the heated portions of the platform 4 into contact with the heated portions of the blocks 5a to 5c.

Thereafter, sufficient pressure is applied to guarantee that the platform 4 is caused to be properly held to the blocks 5a to 5c where said components overlie one another, and the heated portions are allowed to cool while maintaining pressure so as to guarantee excellent quality to the connection interfaces between the components, after which the flash that will have formed due to the compression of the molten material in the heated regions is optionally removed.

Other assembly techniques by partial melting are available to the person skilled in the art.

The present invention is described above with reference to one implementation only, it being understood that the invention is not limited in any way to the particular geometrical shape shown in the figures.

The top structure of the platform may include a structure that is embossed in the form of a grid, which may be done by a thermal press method. The platform may include microperforation. Such a pallet is particularly suitable for use in the cheese industry.

Naturally, the invention is not limited in any way to the geometrical shape of the pallet, in particular with respect to the number of runners or the number of blocks per runner.

I claim:

1. A pallet comprising:
   a platform; and
   a plurality of blocks for spacing said platform from a rest surface to allow a handling member to pass, said plurality of blocks being secured to a bottom face of said platform by a polyfusion method at a connection zone, said polyfusion method minimizing outwardly-opening interstices between said plurality of blocks and said platform, said plurality of blocks having at least one c-shaped plate; and said platform and said plurality of blocks being made of a solid plastics material to minimize outwardly-opening interstices caused by breakage from a blunt instrument.

2. The pallet according to claim 1 wherein said solid plastics material of said platform and said plurality of blocks is polyethylene.

3. The pallet according to claim 1 wherein said solid plastics material of said platform and said plurality of blocks is polypropylene.

4. The pallet according to claim 1 wherein said polyfusion method includes the steps of using a heater mirror technique, a linear vibration welding technique, or a technique of welding by ultrasound or by microwaves.

5. A pallet comprising:
   a platform;
   a plurality of blocks for spacing said platform from a rest surface to allow a handling member to pass, said plurality of blocks being secured to a bottom face of said platform by a polyfusion method at a connection zone, said polyfusion method minimizing outwardly-opening interstices between said plurality of blocks and said platform, said plurality of blocks having at least one x-shaped plate; and
   said platform and said plurality of blocks being made of a solid plastics material to minimize outwardly-opening interstices caused by breakage from a blunt instrument.

6. The pallet according to claim 5 wherein said solid plastics material of said platform and said plurality of blocks is polyethylene.

7. The pallet according to claim 5 wherein said solid plastics material of said platform and said plurality of blocks is polypropylene.

8. The pallet according to claim 5 wherein said polyfusion method includes the steps of using a heater mirror technique, a linear vibration welding technique, or a technique of welding by ultrasound or by microwaves.

9. A pallet comprising:

a platform;

a plurality of blocks for spacing said platform from a rest surface to allow a handling member to pass, said plurality of blocks being secured to a bottom face of said platform by a polyfusion method at a connection zone, said polyfusion method minimizing outwardly-opening interstices between said plurality of blocks and said platform, said plurality of blocks having at least one upside-down v-shaped plate with ramifications; and said platform and said plurality of blocks being made of a solid plastics material to minimize outwardly-opening interstices caused by breakage from a blunt instrument.

10. The pallet according to claim 9 wherein said solid plastics material of said platform and said plurality of blocks is polyethylene.

11. The pallet according to claim 9 wherein said solid plastics material of said platform and said plurality of blocks is polypropylene.

12. The pallet according to claim 9 wherein said polyfusion method includes the steps of using a heater mirror technique, a linear vibration welding technique, or a technique of welding by ultrasound or by microwaves.

* * * * *